(12) United States Patent
Kraemer et al.

(10) Patent No.: US 9,202,101 B2
(45) Date of Patent: *Dec. 1, 2015

(54) ELECTRONIC DEVICE FOR COLLECTING FINGER DATA AND DISPLAYING A FINGER MOVEMENT TRACE AND RELATED METHODS

(71) Applicant: APPLE INC., Cupertino, CA (US)

(72) Inventors: Eric Paul Kraemer, Melbourne, FL (US); James Warren Neil, Melbourne, FL (US); Peter Eric Sherlock, Viera, FL (US)

(73) Assignee: APPLE INC., Cupertino, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/108,456

(22) Filed: Dec. 17, 2013

(65) Prior Publication Data

US 2014/0105470 A1    Apr. 17, 2014

Related U.S. Application Data

(63) Continuation of application No. 13/091,490, filed on Apr. 21, 2011, now Pat. No. 8,638,994.

(51) Int. Cl.
*G06K 9/00* (2006.01)

(52) U.S. Cl.
CPC ........ *G06K 9/00013* (2013.01); *G06K 9/00026* (2013.01)

(58) Field of Classification Search
CPC ............ G06K 9/00013; G06K 9/0002; G06K 9/00026; G06K 9/00154; G07C 9/0015; G07C 9/00158
USPC .................................. 382/124, 115, 119, 120
See application file for complete search history.

(56) References Cited

U.S. PATENT DOCUMENTS

| | | |
|---|---|---|
| 5,828,773 A | 10/1998 | Setlak et al. |
| 5,852,670 A | 12/1998 | Setlak et al. |
| 5,953,441 A | 9/1999 | Setlak |

(Continued)

FOREIGN PATENT DOCUMENTS

| | | |
|---|---|---|
| EP | 1531419 | 5/2005 |
| EP | 1816587 | 8/2007 |

(Continued)

OTHER PUBLICATIONS

Rovati et al., "Spatial-Temporal Motion Estimation for Image Reconstruction and Mouse Functionality With Optical or Capacitive Sensors", IEEE Transactions on Consumer Electronics, vol. 49, No. 3, Aug. 2003, pp. 711-718.

(Continued)

*Primary Examiner* — Ruiping Li
(74) *Attorney, Agent, or Firm* — Allen Dyer Doppelt Milbrath & Gilchrist, P.A.; Christopher F. Regan

(57) ABSTRACT

An electronic device may include a finger sensor, a display, and a controller coupled to the finger sensor and the display. The controller may be configured to collect finger data from multiple portions of a user's finger as the user's finger is moved around on the finger sensor along a finger travel path. The controller may also be configured to generate on the display a finger movement trace corresponding to the finger movement travel path.

29 Claims, 5 Drawing Sheets

(56) References Cited

U.S. PATENT DOCUMENTS

| | | | |
|---|---|---|---|
| 6,289,114 | B1 | 9/2001 | Mainguet |
| 6,795,569 | B1 | 9/2004 | Setlak |
| 6,950,539 | B2 | 9/2005 | Bjorn et al. |
| 7,361,919 | B2 | 4/2008 | Setlak |
| 7,616,787 | B2 | 11/2009 | Boshra |
| 7,751,595 | B2 | 7/2010 | Russo et al. |
| 7,801,340 | B2 | 9/2010 | Abiko |
| 7,853,055 | B2 | 12/2010 | Machida |
| 8,638,994 | B2 | 1/2014 | Kraemer et al. |
| 2005/0244039 | A1 | 11/2005 | Geoffroy et al. |
| 2006/0012570 | A1 | 1/2006 | Yumoto et al. |
| 2006/0093191 | A1 | 5/2006 | Neil et al. |
| 2011/0193727 | A1 | 8/2011 | Goto et al. |

FOREIGN PATENT DOCUMENTS

| | | |
|---|---|---|
| GB | 2331613 | 5/1999 |
| JP | 2000222123 | 8/2000 |
| WO | 0016244 | 3/2000 |
| WO | 2004059613 | 7/2004 |

OTHER PUBLICATIONS

Vermesan et al., "A 500-DPI AC Capacitive Hybrid Flip-Chip CMOS ASIC/Sensor Module for Fingerprint, Navigation, and Pointer Detection With On-Chip Data Processing", IEEE Journal of Solid-State Circuits, vol. 38, No. 12, Dec. 2003, pp. 2288-2296.

ELECTRONIC DEVICE FOR COLLECTING FINGER DATA AND DISPLAYING A FINGER MOVEMENT TRACE AND RELATED METHODS

FIELD OF THE INVENTION

The present invention relates to the field of electronics, and, more particularly, to the field of finger sensors and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention. The fingerprint sensor is an integrated circuit sensor that drives the user's finger with an electric field signal and senses the electric field with an array of electric field sensing pixels on the integrated circuit substrate.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

U.S. Pat. No. 6,289,114 to Mainguet, and assigned to the present assignee, and the entire contents of which are herein incorporated by reference, discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint. A plurality of images are stitched together as the user's finger is swiped over a relatively small sensor.

As fingerprint sensors become increasingly popular, for example, for use in a portable electronic device, the amount of time spent by a user interacting with a fingerprint sensor increases. For example, a fingerprint sensor may be used to allow access to the portable electronic device, i.e. unlock the device, via a swipe of the user's finger when prompted by the device. The user's finger swipe generally has to meet certain criteria, for example, quality and speed, to be recognized by the fingerprint sensor. An improper or bad finger swipe, for example, that may not meet certain speed and quality criteria, may generate an error message and force the user to re-swipe her finger. This may become increasingly time consuming and frustrating for the user. More particularly, a user, with each improper swipe, may try another finger motion or speed, which may be unnatural and non-intuitive. Moreover, training a user on a proper swipe is also time consuming. Thus, as the use of a fingerprint sensor in a portable electronic device becomes increasingly popular, it may be desirable to include additional features.

SUMMARY OF THE INVENTION

In view of the foregoing, it is therefore an object of the present invention to provide an electronic device that facilitates collection of a user's finger data.

This and other objects, features, and advantages in accordance with the present invention are provided by an electronic device that may include a finger sensor, a display, and a controller coupled to the finger sensor and the display. The controller may be configured to collect finger data from multiple portions of a user's finger as the user's finger is moved around on the finger sensor along a finger movement travel path. The controller may also be configured to generate on the display a finger movement trace corresponding to the finger movement travel path, for example. In other words, the electronic device provides visual indications via a game-like interface while collecting finger data to thereby increase user convenience.

The controller may be configured to generate the finger movement trace in real time, for example. The controller may be configured to generate on the display a plurality of finger trace target points for connection via the finger movement trace so that this embodiment may be considered as a connect-the-dots embodiment. Alternatively, the controller may be configured to generate on the display a coating image, for example, and this embodiment may be considered as a virtual scratch-off embodiment.

The electronic device may further include a database for storing finger data. The controller may be configured to determine a match between the collected finger data and finger data stored in the database, for example. The controller may be configured to clear the finger movement trace from the display based upon the match. The controller may be configured to enroll the collected finger data in the database based upon there being no match.

The controller may be configured to clear the finger movement trace from the display based upon a threshold amount of collected finger data, for example. And, the controller may be configured to display a notification on the display based upon a threshold amount of collected finger data.

The controller may be configured to process the collected finger data and generate a finger image based thereon, for example. The finger sensor may have a sensing area smaller than a user's finger. The controller may be configured to generate the finger movement trace to correspond to a finger movement travel path having at least one finger direction change while the user's finger is maintained on the finger sensing area.

A method aspect is directed to a method of collecting finger data in an electronic device that may include a finger sensor, and a display coupled thereto. The method may include collecting finger data from multiple portions of a user's finger as the user's finger is moved around on the sensing area of the finger sensor along a finger movement travel path, for example. The method may also include generating on the display a finger movement trace corresponding to the finger movement travel path.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
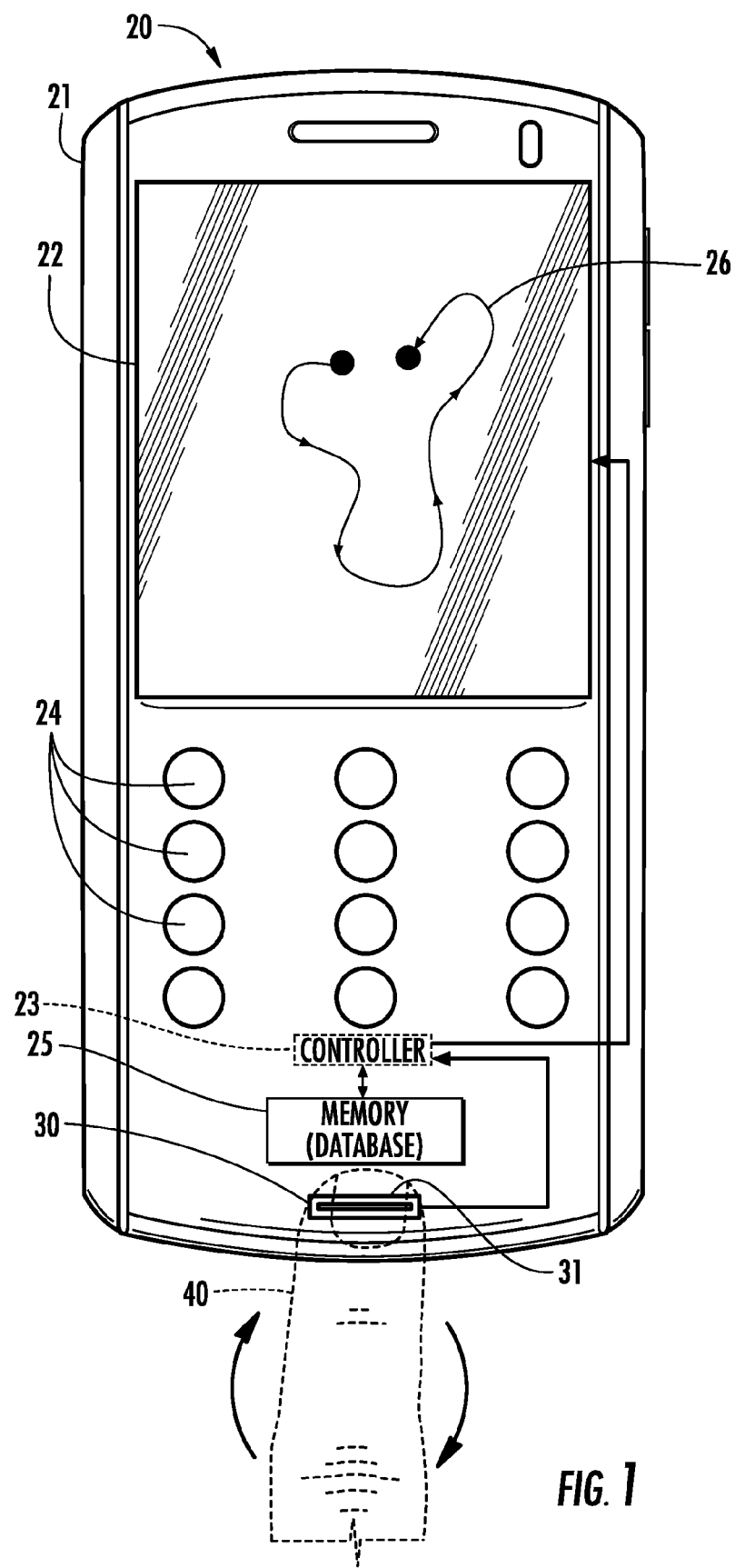
FIG. 1 is a schematic plan view of an electronic device in accordance with the present invention.

Referring initially to FIG. 1, an embodiment of an electronic device 20 in accordance with the present invention is now described. The electronic device 20 is illustratively a cellular telephone. Of course, the electronic device 20 can also be another type of portable or stationary electronic device.

The electronic device 20 includes a housing 21, a display 22 carried by the housing, and a controller 23 or operating circuitry also carried by the housing and connected to the display. An array of input keys 24 are also provided, and, in the example of a cellular telephone, used for conventional cellphone dialing and other applications as will be appreciated by those skilled in the art. The display 22 may be a touch display, as will be appreciated by those skilled in the art. In other words, user input may also be received via the display 22.

The electronic device 20 includes a finger sensor 30 on a lower end thereof adjacent the array of input keys 24. Illustratively, the finger sensor area 30 has a sensing area that is smaller than the user's finger. For example, the finger sensor 30 may be a module AES 1750 from Authentec, Inc. of Melbourne, Fla. with a sensing array size of 6.5 mm by 0.41 mm, for example.

The finger sensor 30 is illustratively a slide type finger sensor, for example where the user's finger slides over the sensing area 31 to generate a sequence of finger data. Other types of sensors may be used, as will be appreciated by those skilled in the art.

Additionally, the finger sensing area 31 may also include an array of electric field sensing electrodes (not shown). Capacitive and/or thermal sensing pixels may also be used, for example.

The controller 23 is configured to collect finger data from multiple portions of a user's finger as the user's finger is moved around on the sensing area of the finger sensor along a finger travel path. More particularly, the controller 23 cooperates with the finger sensor 30 to collect images of portions of the user's finger 40. The finger sensor 30 and controller 23 advantageously cooperate to determine "push" swipes from "pull" swipes of the user's finger 40. The controller 23 stitches or processes the image portions together to form a complete image of the user's finger or a complete image of a portion thereof. By image is not necessarily meant an image of the ridges and valleys, but can also include ridge flow vectors, or minutiae points, for example.

The controller 23 is also configured to generate on the display 22 a finger movement trace 26 corresponding to the finger movement travel path. The illustrated trace is completely persistent in that it shows movement from start to finish, although in other embodiments, complete persistence may not be needed. In particular, the controller 23 may cooperate with the display 22 and enter a "doodle" mode. In the "doodle" mode, a line or shape corresponding to the user's random finger movement over the finger sensing area 31 is displayed in real time. The doodling motion is similar to the motion for standard navigation on a navigation device (e.g., a trackpad, a trackball, a touch screen, etc.), and thus, the user is encouraged to increase the total area of skin that has been contacted by the finger sensor 30, and thus, the amount of finger data collected. In this way, the collection of the finger data from the user's finger 40, for the purposes of matching and/or enrollment, as is described in further detail below, for example, may be transparent to the user while the user doodles. In other words, the "doodle" mode may be considered a "game," for example.

The electronic device 20 may further include a database 25 coupled to the controller 23 that stores finger data. The "push" swipes and the "pull" swipes of the user's finger 40 may be stored in the database 25. The "push" swipes and the "pull" swipes may be stored as "push" and "pull" swipes, and/or stored "push" and "pull" swipes may be used for matching, for example.

By way of the "doodle" mode, after a threshold amount of finger data is collected via the finger sensor 30, i.e. a threshold number of sufficiently different finger image portions, to be sufficient to determine a match, the controller 23 advantageously determines whether the collected finger data matches a stored set of finger data. If a match is found, the controller 23 may display an indication on the display 22 that a match has been found and the user has been authenticated. Alternatively, or additionally, the controller 23 may terminate the game or doodle mode, i.e., clear the finger movement trace 26 from the display 22, and display a main menu, for example. The controller 23 may cooperate with the display 22 to perform other actions based upon a successful match, for example, change the contents of the display.

Additionally, as will be appreciated by those skilled in the art, the controller 23 may perform an anti-spoofing process, where, in relatively high security instances, for example, the user may be validated with both "push" and "pull" swipes, which may take advantage of the natural finger distortion properties being distinct from a mechanical spoof finger, for example. The controller 23 may perform other anti-spoof processing.

If a match is not found, the controller 23 may continue to collect finger data from multiple portions of the user's finger to perform an enrollment, as will be appreciated by those skilled in the art. In other words, if the controller 23 does not find a match in the database 25, the controller may collect additional finger image portions and store the finger data or images in the database 25, such as for future matching. The "push" swipes and the "pull" swipes may also be used during the enrollment to build a template for matching, for example, as will be appreciated by those skilled in the art. Alternatively, the controller 23 may perform the enrollment without matching if, for example, that the collected finger data is not already stored in the database 25.

When the controller 23 has collected a threshold amount of finger data, i.e. enough finger data to complete an enrollment, the controller may clear the finger movement trace 26 from the display 22. Of course, the controller 23 may change or alter the finger movement trace 26 or the contents of the display 22 when a threshold amount of finger data has been collected. The threshold amount of finger data may be adjusted based upon a desired level of matching or enrollment, or other factors, as will be appreciated by those skilled in the art.

Because the motion of the user's finger 40 is comparable to the motion of a standard navigation device, for example, the user typically understands that the "doodling" operation is for a single finger, which reduces enrollment errors that may be caused by using multiple fingers or the need for multiple touches of the same finger. In other words, the motion of the user's finger 40 along the path of travel discourages the use of multiple fingers.

Advantageously, by using a "game" for matching or enrollment, rigid rules that typically accompany the matching or enrollment process may be avoided. For example, in a typical enrollment or matching process, the user is directed, via the display 22, for example, to place his or her finger on the finger sensor, swipe the finger at a given speed, in a given direction, and/or a number of times. The desired motion and speed may be unnatural to a user, and multiple swipes where the user removes and replaces their finger are generally time consuming and may be confusing for the user. Bad or improper swipes are rejected and the user is notified, which may frustrate the user.

As will be appreciated by those in the art, training a user to swipe her finger so that the swipes are "good" is generally time consuming and may be relatively difficult. In the present embodiments, the user, by way of the "doodle" mode, advantageously reduces these rigid rules and thus improves the overall user experience through an increasingly intuitive process.

Compared to prior enrollment processes that require 3 to 10 swipes with a pause between each, the enrollment time may be reduced to less than 3 seconds, for example. In other words, the finger data for enrollment may be collected and the enrollment performed in a single touch of the user's finger 40, for example. Moreover, since more finger data or images are collected compared to prior enrollment techniques, finger data stored in the database 25, i.e. templates, may be improved, and in particular, the false acceptance rate (FAR)/false rejection rate (FRR) results may be improved. The rate at which data is collected (e.g. data vs. total time) may also improve. Also, there is an increased tolerance to partial swipes or swipes that travel too far to a side. Matching accuracy against both "push" and "pull" swipes, a common problem with prior approaches, is also increased.

Figure 2:
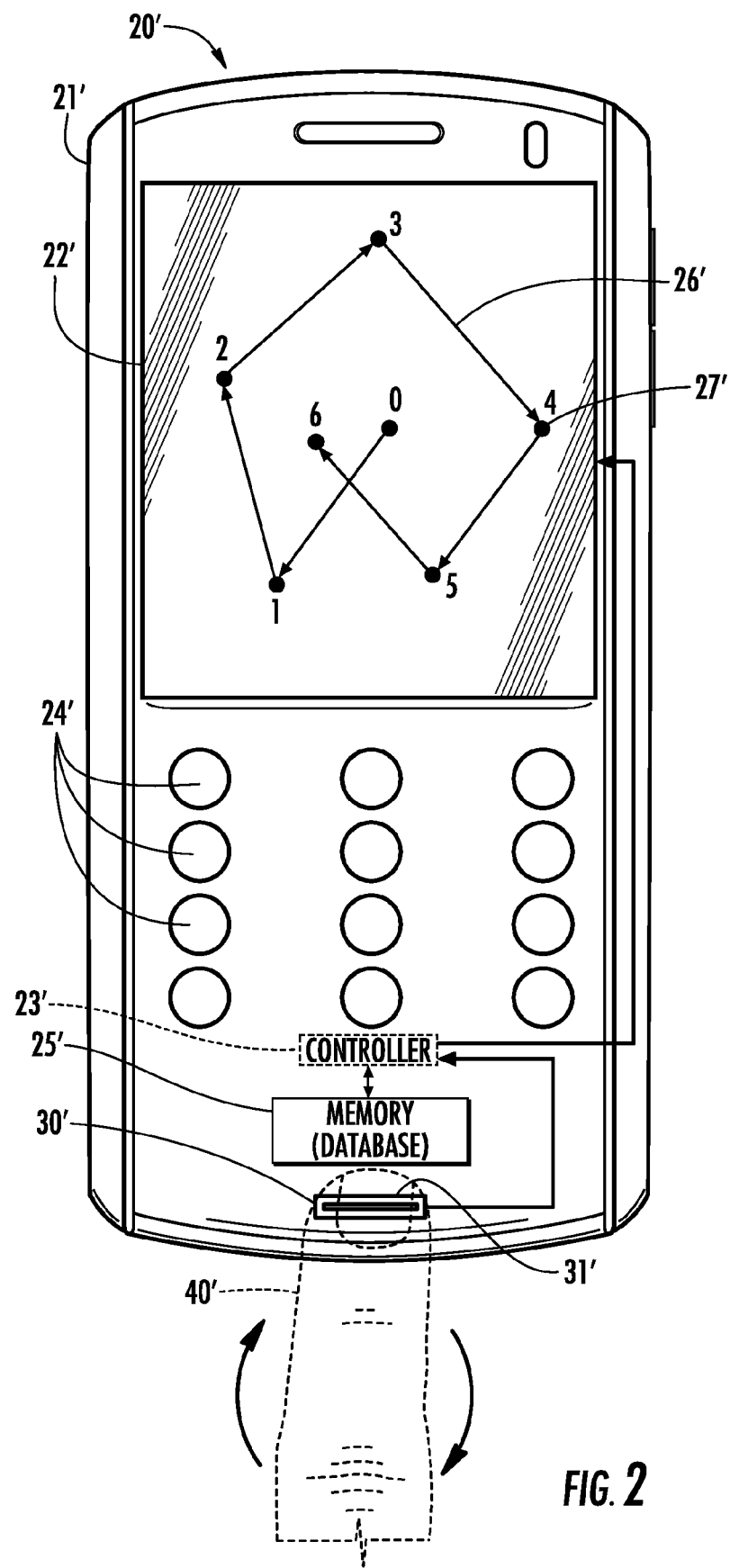
FIG. 2 is a schematic plan view of an electronic device including a finger sensor in accordance with yet another embodiment of the present invention.

Referring now to FIG. 2, in another embodiment, the controller 23' is configured to generate on the display 22' finger trace target points 27' for connection via the finger movement trace 26'. In other words, the controller 23' may cooperate with the display 22' and enter a "connect-the-dots" mode. The finger trace target points 27' may be arranged on the display 22' so that when the finger movement trace 26' is generated, in real time, that corresponds to a finger movement travel path that connects the dots, an overall complete image may be displayed, for example, an animal or a shape. Similar to the embodiment described above with respect to FIG. 1, finger data from multiple portions of the user's finger 40' are collected as the user's finger connects the finger trace target points. Matching and enrollment may be performed, as described above.

Figure 3:
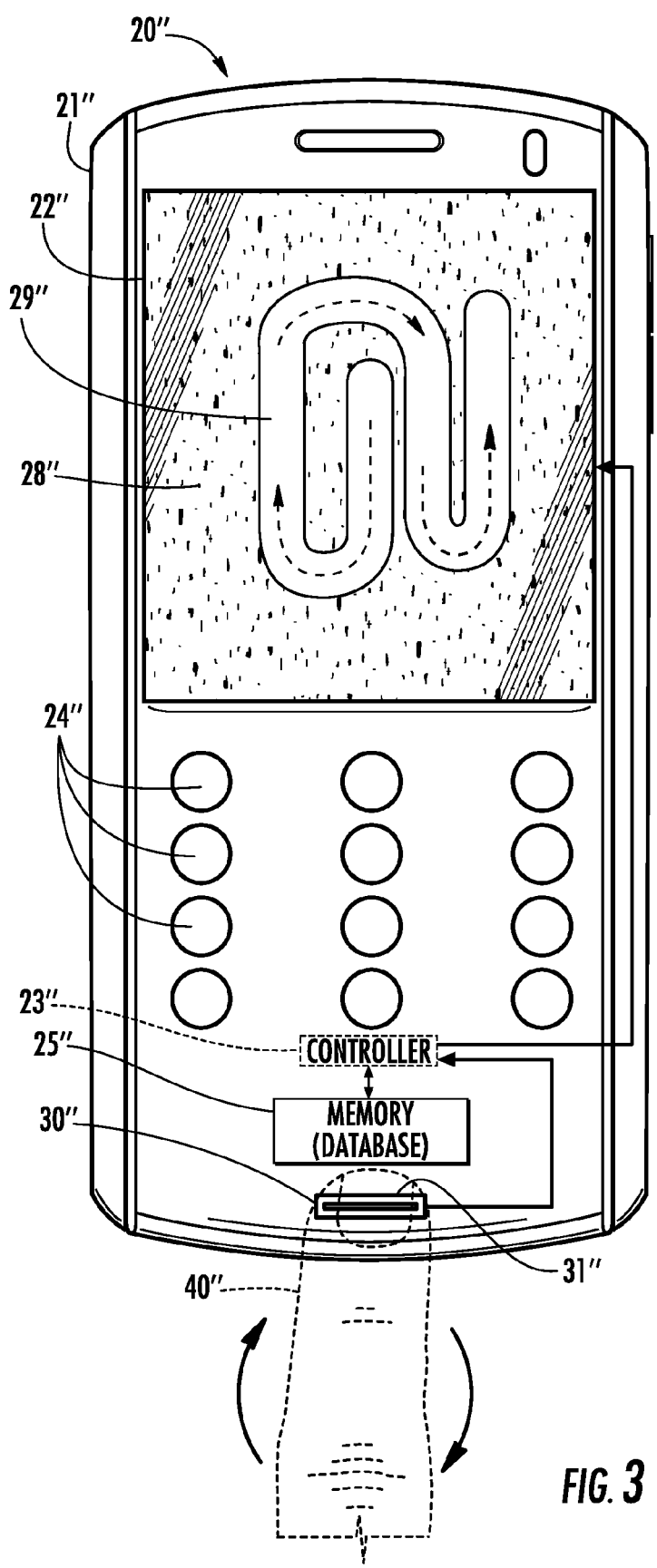
FIG. 3 is a schematic plan view of an electronic device including a finger sensor in accordance with yet another embodiment of the present invention.

Referring now to FIG. 3, in yet another embodiment, the controller 23" is configured to display a coating image on the display 22", and the finger movement trace 26" corresponds to a virtual scratch-off of the coating image. More particularly, the controller 23" may cooperate with the display 22" and enter a "scratch-off mode" mode. The coating image 28" may resemble a silver-like coating that may typically be found on a lottery scratch off ticket, for example. The user, thus "rubs" their finger 40" over the finger sensor 30" and the coating image 28".

The rubbing motion is similar to the motion for standard navigation on a navigation device (e.g., a trackpad, a trackball, a touch screen, etc.). Based upon the rubbing motion of the user's finger 40" over the coating image 28", the coating image appears to the user, in real time, as if it is being "scratched off" to reveal an underlying image 29", for example. The rubbing motion of the user's finger 40" on the finger sensor 30" also reduces the likelihood that the user is "scratching" too quickly, likely because the scratching motions involved a change in direction of the user's finger 40". Similar to the embodiment described above with respect to FIG. 1, finger data from multiple portions of the user's finger 40" are collected as the user's finger scratches, and matching and enrollment may be performed.

Other finger-based games may be included as will be appreciated by those skilled in the art. For example, as will be appreciated by those skilled in the art, direction vector information may derived or processed from two or more images or frames of the collected finger data and may be used to guide the user through the display 22. Moreover, the finger sensor 30 may subsequently cooperate with the controller 23 to perform a navigation function, for example, move a cursor on the display 22. Moreover, while the finger movement trace 26 is generated in real time, those skilled in the art will appreciate that real time may be near real time so as to give the impression to the user that it is real time.

Figure 4:
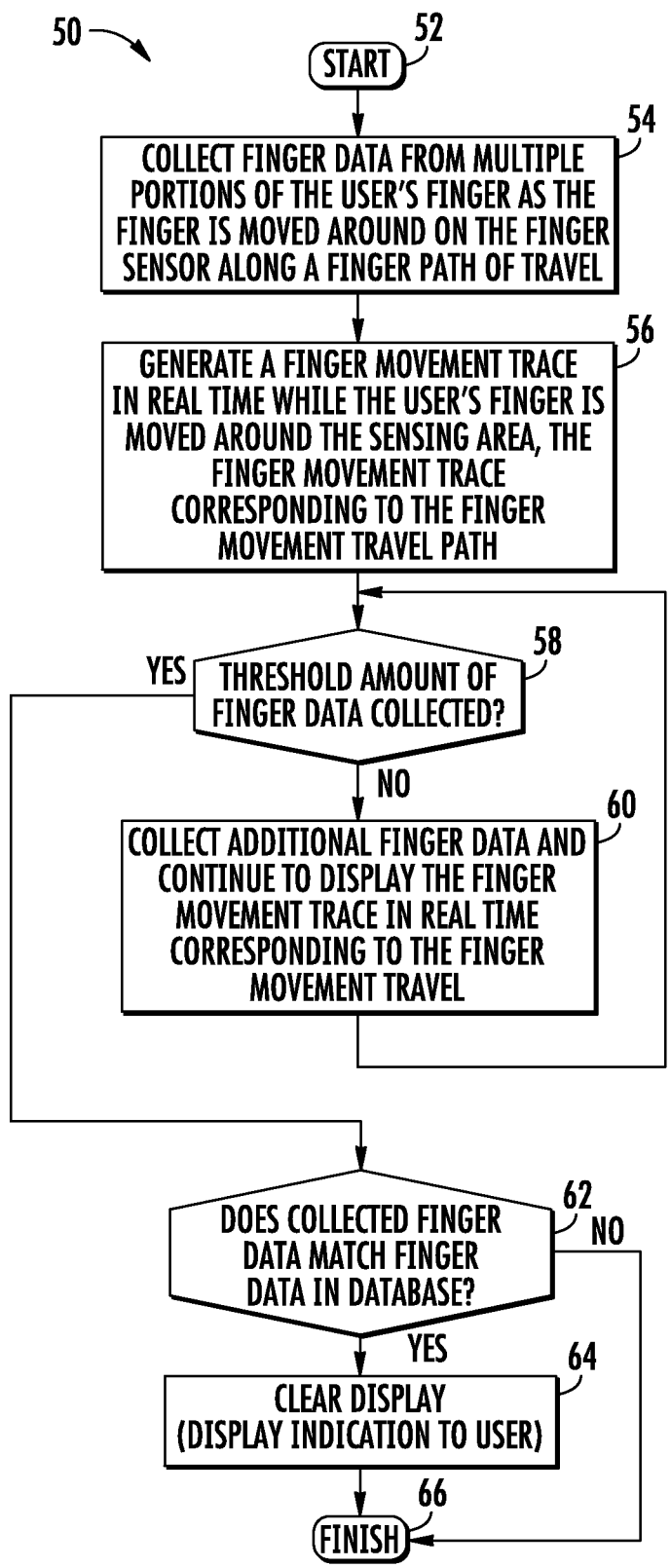
FIG. 4 is a block diagram of a method of collecting finger data according to the present invention.

Referring now to the flowchart 50 in FIG. 4, a method of collecting and matching finger data in an electronic device 20 including a finger sensor 30 and a display 22 coupled thereto is described. Beginning at Block 52, the method includes collecting finger data from multiple portions of a user's finger as the user's finger 40 is moved around on the sensing area of the finger sensor 30 along a finger travel path (Block 54). At Block 56, while the user's finger 40 is moved around the sensing area, a finger movement trace 26 corresponding to the finger movement travel path is generated in real time on the display 22.

At Block 58, a determination is made as to whether a threshold amount of finger data has been collected. If the threshold amount of finger data has not been collected, additional finger data is collected and the finger movement trace 26 is continued to be displayed on the display (Block 60). If the threshold amount of finger data has been collected, a determination is made, at Block 62, if the collected finger data matches stored finger data in a database 25. If the collected finger data matches the stored finger data, the finger movement trace 26 is cleared from the display 22 at Block 64. The method finishes at Block 66.

Figure 5:
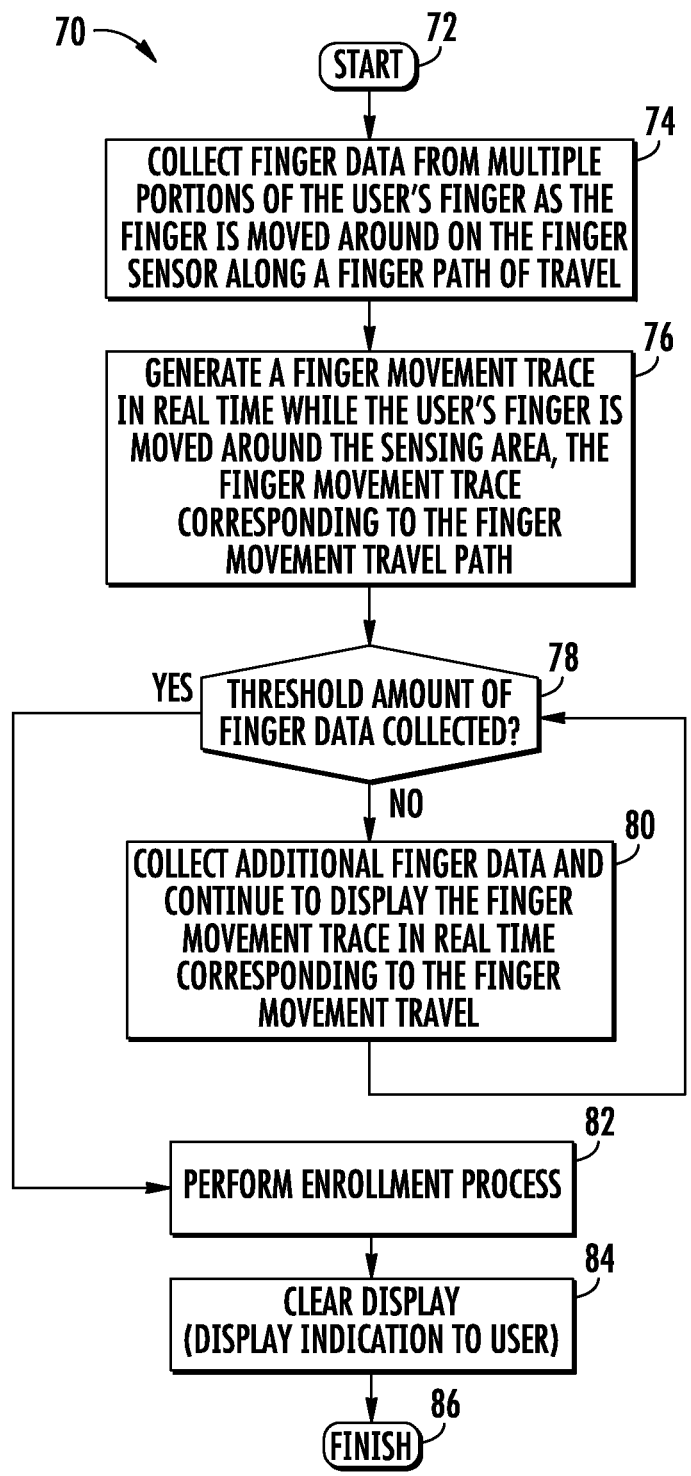
FIG. 5 is another block diagram of a method of collecting finger data according to the present invention.

Referring now to the flowchart 70 in FIG. 5, a method of collecting and enrolling finger data in the electronic device 20 is described. Beginning at Block 72, the method includes collecting finger data from multiple portions of a user's finger as the user's finger 40 is moved on the sensing area of the finger sensor 30 along a finger travel path (Block 74). At Block 76, while the user's finger 40 is moved around the sensing area, a finger movement trace 26 corresponding to the finger movement travel path is generated in real time on the display 22.

At Block 78, a determination is made as to whether a threshold amount of finger data has been collected. If the threshold amount of finger data has not been collected, additional finger data is collected and the finger movement trace 26 is continued to be displayed on the display (Block 80). If the threshold amount of finger data has been collected, at Block 82, the finger data is enrolled. In other words, the finger data is stored in the database 26 for use in matching, for example. After the enrollment process is completed, the finger movement trace 26 is cleared from the display 22 at Block 84. The method ends at Block 86. Of course the methods described with respect to FIGS. 4 and 5 may be combined as would be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a finger sensor;
   a display; and
   a controller coupled to said finger sensor and said display, and capable of
      collecting finger data as a user's finger is moved around on said finger sensor along a finger movement travel path,
      generating on said display a coating image, and
      generating on said display a finger movement trace corresponding to the finger movement travel path and a virtual scratch-off of the coating image.

2. The electronic device according to claim 1, wherein said controller is capable of generating the finger movement trace in real time.

3. The electronic device according to claim 1, further comprising a database for storing finger data; and wherein said controller is capable of determining a match between the collected finger data and finger data stored in said database.

4. The electronic device according to claim 3, wherein said controller is capable of clearing the finger movement trace from said display based upon the match.

5. The electronic device according to claim 3, wherein said controller is capable of enrolling the collected finger data in said database based upon there being no match.

6. The electronic device according to claim 1, wherein said controller is capable of clearing the finger movement trace from said display based upon a threshold amount of collected finger data.

7. The electronic device according to claim 1, wherein said controller is capable of displaying a notification on said display based upon a threshold amount of collected finger data.

8. The electronic device according to claim 1, wherein said controller is capable of processing the collected finger data and generating a finger image based thereon.

9. The electronic device according to claim 1, wherein said finger sensor has a sensing area smaller than a user's finger.

10. The electronic device according to claim 1, wherein said controller is capable of generating the finger movement trace to correspond to a finger movement travel path having at least one finger direction change while the user's finger is continuously maintained on the finger sensing area.

11. A method of collecting finger data in an electronic device comprising a finger sensor and a display, the method comprising:
   collecting finger data as a user's finger is moved around on the finger sensor along a finger movement travel path;
   generating on the display a coating image; and
   generating on the display a finger movement trace corresponding to the finger movement travel path and a virtual scratch-off of the coating image.

12. The method according to claim 11, wherein the finger movement trace is generated on the display in real time.

13. The method according to claim 11, further comprising determining a match between the collected finger data and finger data stored in a database.

14. The method according to claim 13, further comprising clearing the finger movement trace from the display based upon the match.

15. The method according to claim 13, further comprising enrolling the collected finger data in the database based upon there being no match.

16. The method according to claim 11, wherein the finger movement trace is generated to correspond to a finger movement travel path having at least one finger direction change while the user's finger is continuously maintained on the finger sensing area.

17. The method according to claim 11, wherein the electronic device further comprises a controller coupled to the finger sensor and display; and wherein collecting finger data, generating the coating image, and generating the finger movement trace comprises operating the controller to perform each in cooperation with the finger sensor and display.

18. An electronic device comprising:
   a finger sensor;
   a display; and
   a controller coupled to said finger sensor and said display, and capable of
      collecting finger data as a user's finger is moved around on said finger sensor along a finger movement travel path,
      generating on said display a finger movement trace corresponding to the finger movement travel path, and
      generating on said display a plurality of spaced apart finger trace target points for connection via the finger movement trace.

19. The electronic device according to claim 18, wherein said controller is capable of generating the finger movement trace in real time.

20. The electronic device according to claim 18, further comprising a database for storing finger data; and wherein said controller is capable of determining a match between the collected finger data and finger data stored in said database.

21. The electronic device according to claim 20, wherein said controller is capable of clearing the finger movement trace from said display based upon the match.

22. The electronic device according to claim 20, wherein said controller is capable of enrolling the collected finger data in said database based upon there being no match.

23. A method of collecting finger data in an electronic device comprising a finger sensor and a display, the method comprising:
   collecting finger data as a user's finger is moved around on the finger sensor along a finger movement travel path;
   generating on the display a finger movement trace corresponding to the finger movement travel path; and
   generating on the display a plurality of spaced apart finger trace target points for connection via the finger movement trace.

24. The method according to claim 23, wherein the finger movement trace is generated on the display in real time.

25. The method according to claim 23, further comprising determining a match between the collected finger data and finger data stored in a database.

26. The method according to claim 25, further comprising clearing the finger movement trace from the display based upon the match.

27. The method according to claim 25, further comprising enrolling the collected finger data in the database based upon there being no match.

28. The method according to claim 23, wherein the finger movement trace is generated to correspond to a finger movement travel path having at least one finger direction change while the user's finger is continuously maintained on the finger sensing area.

29. The method according to claim 23, wherein the electronic device further comprises a controller coupled to the finger sensor and display; and wherein collecting finger data, generating the finger movement trace, and generating the spaced apart finger trace target points comprises operating the controller to perform each in cooperation with the finger sensor and display.

\* \* \* \* \*